(12) United States Patent
Hayami

(10) Patent No.: US 12,390,736 B2
(45) Date of Patent: Aug. 19, 2025

(54) NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

(71) Applicant: NINTENDO CO., LTD., Kyoto (JP)

(72) Inventor: Shun Hayami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 244 days.

(21) Appl. No.: 18/462,153

(22) Filed: Sep. 6, 2023

(65) Prior Publication Data

US 2024/0198229 A1  Jun. 20, 2024

(30) Foreign Application Priority Data

Dec. 14, 2022  (JP) ................. 2022-199094

(51) Int. Cl.
| | |
|---|---|
| *A63F 13/577* | (2014.01) |
| *A63F 13/52* | (2014.01) |
| *A63F 13/54* | (2014.01) |
| *A63F 13/56* | (2014.01) |
| *A63F 13/57* | (2014.01) |
| *A63F 13/573* | (2014.01) |
| *A63F 13/537* | (2014.01) |

(52) U.S. Cl.
CPC ............ *A63F 13/577* (2014.09); *A63F 13/52* (2014.09); *A63F 13/54* (2014.09); *A63F 13/56* (2014.09); *A63F 13/57* (2014.09); *A63F 13/573* (2014.09); *A63F 13/537* (2014.09); *A63F 2300/64* (2013.01)

(58) Field of Classification Search
CPC .......... A63F 13/54; A63F 13/56; A63F 13/57; A63F 13/577; A63F 13/52; A63F 13/537; A63F 13/573; A63F 2300/64
See application file for complete search history.

(56) References Cited

U.S. PATENT DOCUMENTS

| | | | |
|---|---|---|---|
| 7,493,244 B2 * | 2/2009 | Leprevost | G06T 13/20 703/2 |
| 7,637,813 B2 * | 12/2009 | Katayama | A63F 13/573 463/31 |

(Continued)

FOREIGN PATENT DOCUMENTS

| | | |
|---|---|---|
| JP | H08-329273 | 12/1996 |
| JP | 2003-181135 | 7/2003 |

(Continued)

OTHER PUBLICATIONS

Apr. 2, 2024 Office Action issued in Japanese Patent Application No. 2022-199094, pp. 1-3 [machine translation included].

*Primary Examiner* — William H McCulloch, Jr.
(74) *Attorney, Agent, or Firm* — Nixon & Vanderhye PC

(57) ABSTRACT

When a first speed indicating a speed difference between a first object and another object at a point of contact between both objects, or a ratio of the first speed to a second speed indicating a speed difference between centers of gravity of both objects, is within a first range including 0, a rolling sound is outputted. When the first speed or the ratio of the first speed to the second speed is within a second range not including 0, a sliding sound is outputted.

22 Claims, 12 Drawing Sheets

(56) References Cited

U.S. PATENT DOCUMENTS

| | | | | |
|---|---|---|---|---|
| 8,068,096 B2* | 11/2011 | Taira | ................. | G06F 3/0346 345/158 |
| 8,698,793 B2* | 4/2014 | Takayama | ............ | A63F 13/803 345/473 |
| 10,022,628 B1* | 7/2018 | Matsumiya | ............ | A63F 13/577 |
| 10,525,354 B2* | 1/2020 | Sato | ................. | A63F 13/44 |
| 10,744,410 B2* | 8/2020 | Hayami | ................. | A63F 13/57 |
| 11,498,004 B2* | 11/2022 | Aonuma | ................. | A63F 13/57 |
| 11,972,353 B2* | 4/2024 | Zinno | ................. | G06N 3/08 |
| 12,179,111 B2* | 12/2024 | Iwao | ................. | A63F 13/5372 |
| 2003/0216179 A1* | 11/2003 | Suzuki | ................. | A63F 13/10 463/35 |
| 2006/0094502 A1* | 5/2006 | Katayama | ............ | A63F 13/2145 463/31 |
| 2006/0262114 A1* | 11/2006 | Leprevost | ................. | G06F 17/11 345/419 |
| 2007/0269054 A1* | 11/2007 | Takagi | ................. | A63F 13/57 381/71.4 |
| 2010/0160011 A1 | 6/2010 | Izumi et al. | | |
| 2011/0074768 A1* | 3/2011 | Takayama | ............ | A63F 13/428 345/419 |
| 2013/0158966 A1* | 6/2013 | Baek | ................. | A63F 13/573 703/6 |
| 2016/0074753 A1* | 3/2016 | Frostberg | ................. | A63F 13/57 463/31 |
| 2017/0354886 A1* | 12/2017 | Sato | ................. | A63F 13/44 |
| 2018/0089942 A1* | 3/2018 | Filipour | ............ | G07F 17/3244 |
| 2019/0060754 A1* | 2/2019 | Hayami | ................. | A63F 13/57 |
| 2023/0082510 A1* | 3/2023 | Wang | ................. | A63F 13/5375 463/6 |
| 2023/0277936 A1* | 9/2023 | Fukada | ................. | A63F 13/69 463/31 |
| 2023/0277941 A1* | 9/2023 | Fukada | ................. | A63F 13/63 463/31 |
| 2024/0082721 A1* | 3/2024 | Sato | ................. | A63F 13/5258 |
| 2024/0198229 A1* | 6/2024 | Hayami | ................. | A63F 13/54 |
| 2024/0278116 A1* | 8/2024 | Peltier | ................. | A63F 13/52 |
| 2024/0278129 A1* | 8/2024 | Iwao | ................. | A63F 13/837 |

FOREIGN PATENT DOCUMENTS

| | | |
|---|---|---|
| JP | 2003325972 A | 11/2003 |
| JP | 2003-340150 | 12/2003 |
| JP | 2007-037664 | 2/2007 |
| JP | 2007-212635 | 8/2007 |
| JP | 2007-307006 | 11/2007 |

* cited by examiner

NON-TRANSITORY COMPUTER-READABLE STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2022-199094 filed on Dec. 14, 2022, the entire contents of which are incorporated herein by reference.

FIELD

The present disclosure relates to information processing for a game or the like.

BACKGROUND AND SUMMARY

Hitherto, game processing in which, on the basis of an operation input, an object in a virtual space is rolled and a rolling sound (sound effect) is also outputted has been known.

The game processing described above does not handle sound effects for motions other than rolling, such as rubbing or sliding. In recent years, the behavior of objects is often controlled by physics calculation, but in such control, improvements are needed to identify the state of motion such as the case of rolling or the case of rubbing or sliding and to output sound effects appropriately.

Therefore, it is an object of the exemplary embodiments to provide a non-transitory computer-readable storage medium having a game program stored therein, a game processing system, a game processing apparatus, and a game processing method that, when an object in a virtual space performs various motions in relation to another object, can appropriately perform processing corresponding to each case.

In order to attain the object described above, for example, the following configuration examples are exemplified.

A configuration example is directed to a non-transitory computer-readable storage medium having stored therein instructions that, when executed by a processor of an information processing apparatus, cause the information processing apparatus to:
control motion of a first object in a virtual space;
when the first object and another object are in contact with each other and are not stationary relative to each other, calculate a point of contact between the first object and the other object;
compare a first speed indicating a speed difference between the first object and the other object at the point of contact and a second speed indicating a speed difference between a center of gravity or a predetermined reference point of the first object and a center of gravity or a predetermined reference point of the other object; and
when the first speed or a ratio of the first speed to the second speed satisfies a first condition of being within a first range including 0,
perform a first process for the first object, and
when the first speed or the ratio of the first speed to the second speed satisfies a second condition of being within a second range not including 0,
perform a second process for the first object.

According to the above configuration, different processes can be performed depending on the type of motion of the object.

In another configuration example, the first process may be a process of outputting a first sound associated with the first object, and the second process may be a process of outputting a second sound associated with the first object and different from the first sound.

According to the above configuration, different sound effects can be generated depending on the type of motion of the object.

In another configuration example, the first process may be a process performed when the first object is rolling on the other object, and the second process may be a process performed when the first object is rubbing or sliding on the other object.

According to the above configuration, a rolling sound and a rubbing (sliding) sound can be selectively used according to the behavior of the object.

In another configuration example, the instructions further cause the information processing apparatus to:
when the second condition is satisfied,
determine a direction in which the first object rotates while rubbing or sliding on the other object, on the basis of whether a speed of the first object at the point of contact with respect to the center of gravity or the predetermined reference point of the first object is positive or negative.

According to the above configuration, the direction of rotation of the object occurring while rubbing (or sliding) can be determined.

In another configuration example, the second range may be a range where the first speed or the ratio of the first speed to the second speed falls outside the first range.

According to the above configuration, a rolling sound and a rubbing (sliding) sound can be outputted continuously.

In another configuration example, the instructions further cause the information processing apparatus to control the motion of the first object on the basis of physics calculation based on at least virtual power, virtual gravity, and collision.

According to the above configuration, a rolling sound and a rubbing (sliding) sound can be outputted in accordance with the physics calculation.

In another configuration example, the other object may be an object that does not move in the virtual space, the first speed may be a speed of the first object at the point of contact, and the second speed may be a speed of the center of gravity or the predetermined reference point of the first object.

In another configuration example, the other object may be a terrain object in the virtual space.

According to the above configuration, a rolling sound and a rubbing (sliding) sound can be outputted for the object performing motion on the terrain object.

In another configuration example, the other object may be an object that moves in the virtual space, the first speed may be a relative speed between the first object and the other object at the point of contact, and the second speed may be a relative speed between the center of gravity or the predetermined reference point of the first object and the center of gravity or the predetermined reference point of the other object.

According to the above configuration, a rolling sound and a rubbing (sliding) sound can be outputted for the object performing motion on the moving object.

According to the exemplary embodiments, it is possible to provide a non-transitory computer-readable storage medium having a game program stored therein, a game processing system, a game processing apparatus, and a game processing method that, when an object in a virtual space performs various motions in relation to another object, can appropriately perform processing corresponding to each case.

DETAILED DESCRIPTION OF NON-LIMITING EXAMPLE EMBODIMENTS

Hereinafter, an exemplary embodiment will be described.
[Hardware Configuration of Information Processing System]

Hereinafter, an information processing system (game system) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment will be described, and then, the control of the game system 1 according to the exemplary embodiment will be described.

Figure 1:
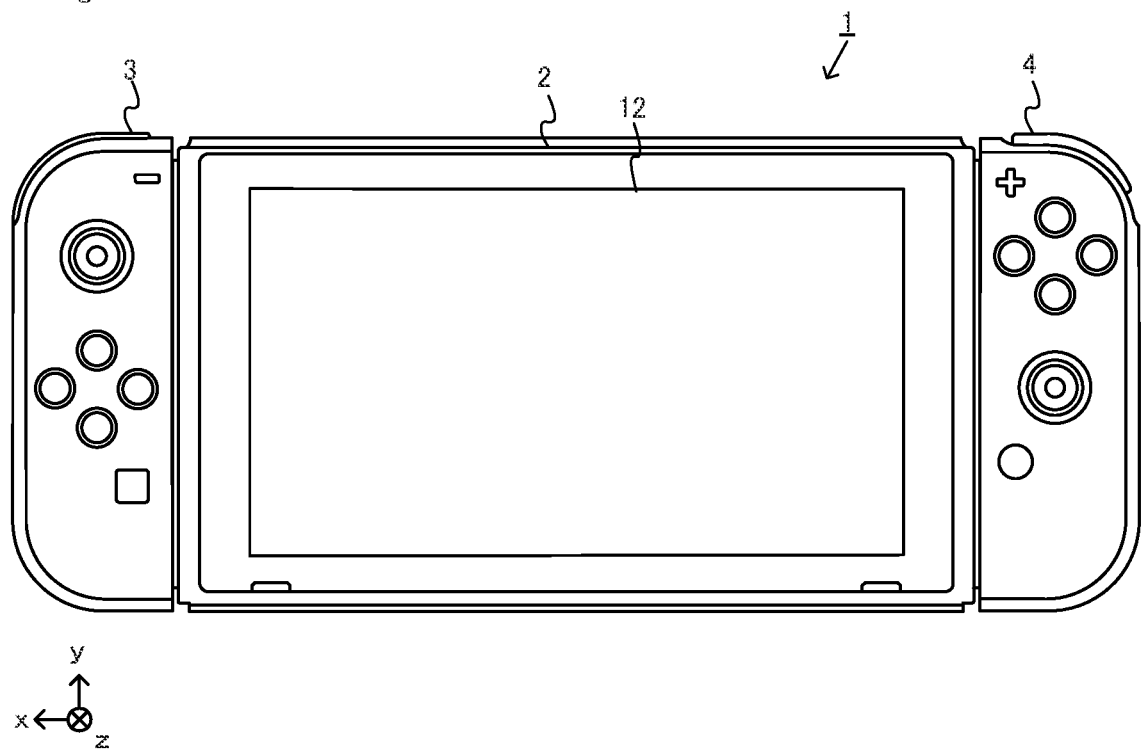
FIG. 1 shows a non-limiting example of a state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The main body apparatus 2 also includes speakers 88, and sounds such as sound effects are outputted from the speakers 88.

The main body apparatus 2 also includes a left terminal 17 for the main body apparatus 2 to perform wired communication with the left controller 3, and a right terminal 21 for the main body apparatus 2 to perform wired communication with the right controller 4.

The main body apparatus 2 also includes a slot 23. The slot 23 is provided on an upper side surface of a housing of the main body apparatus 2. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Each of the left controller 3 and the right controller 4 includes various operation buttons, etc. The various operation buttons, etc., are used to give instructions according to various programs (e.g., an OS program and an application program) executed by the main body apparatus 2.

Each of the left controller 3 and the right controller 4 also includes a terminal 42 or 64 for performing wired communication with the main body apparatus 2.

Figure 2:
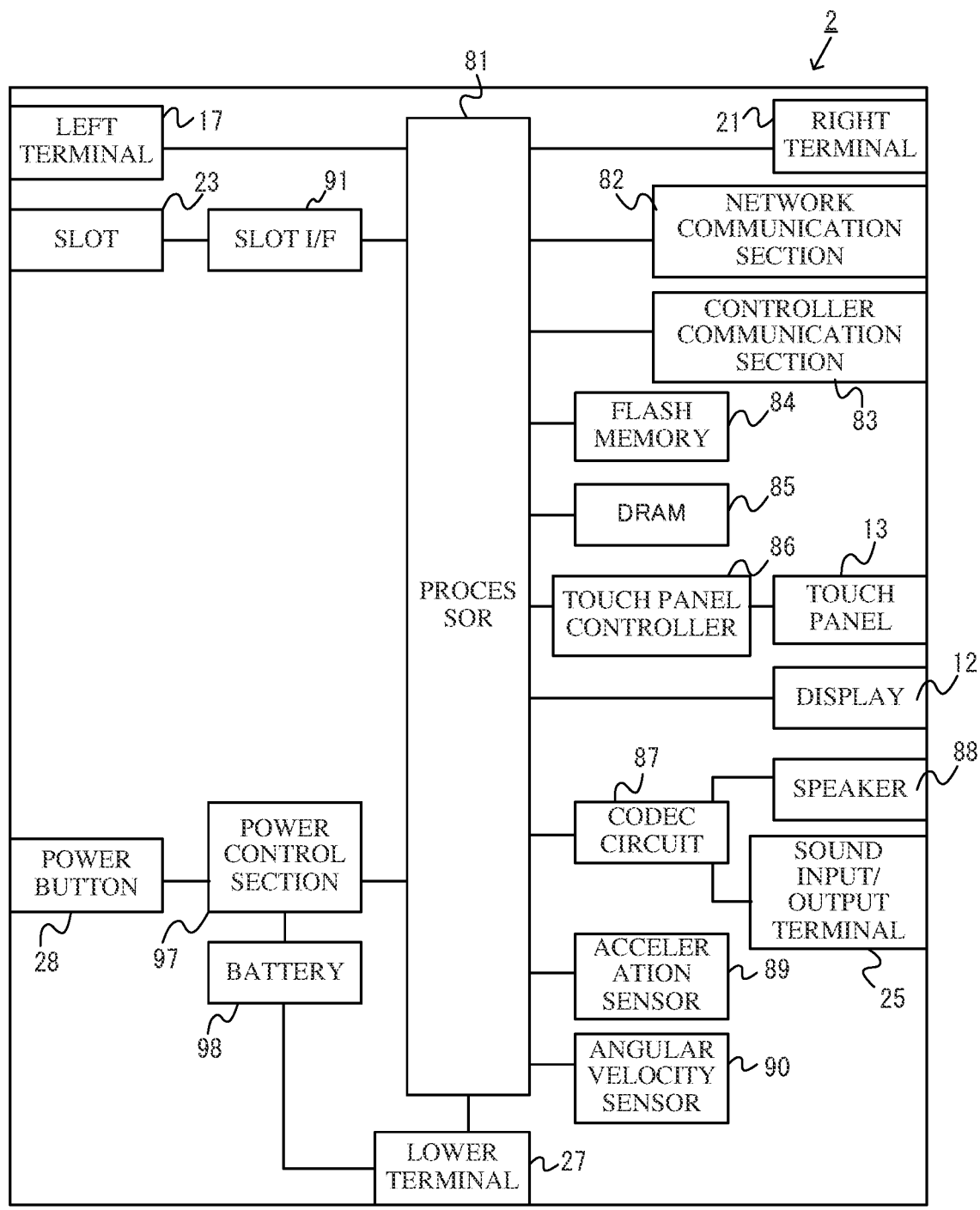
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the above left terminal 17, the above right terminal 21, and a lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with a cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling a touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
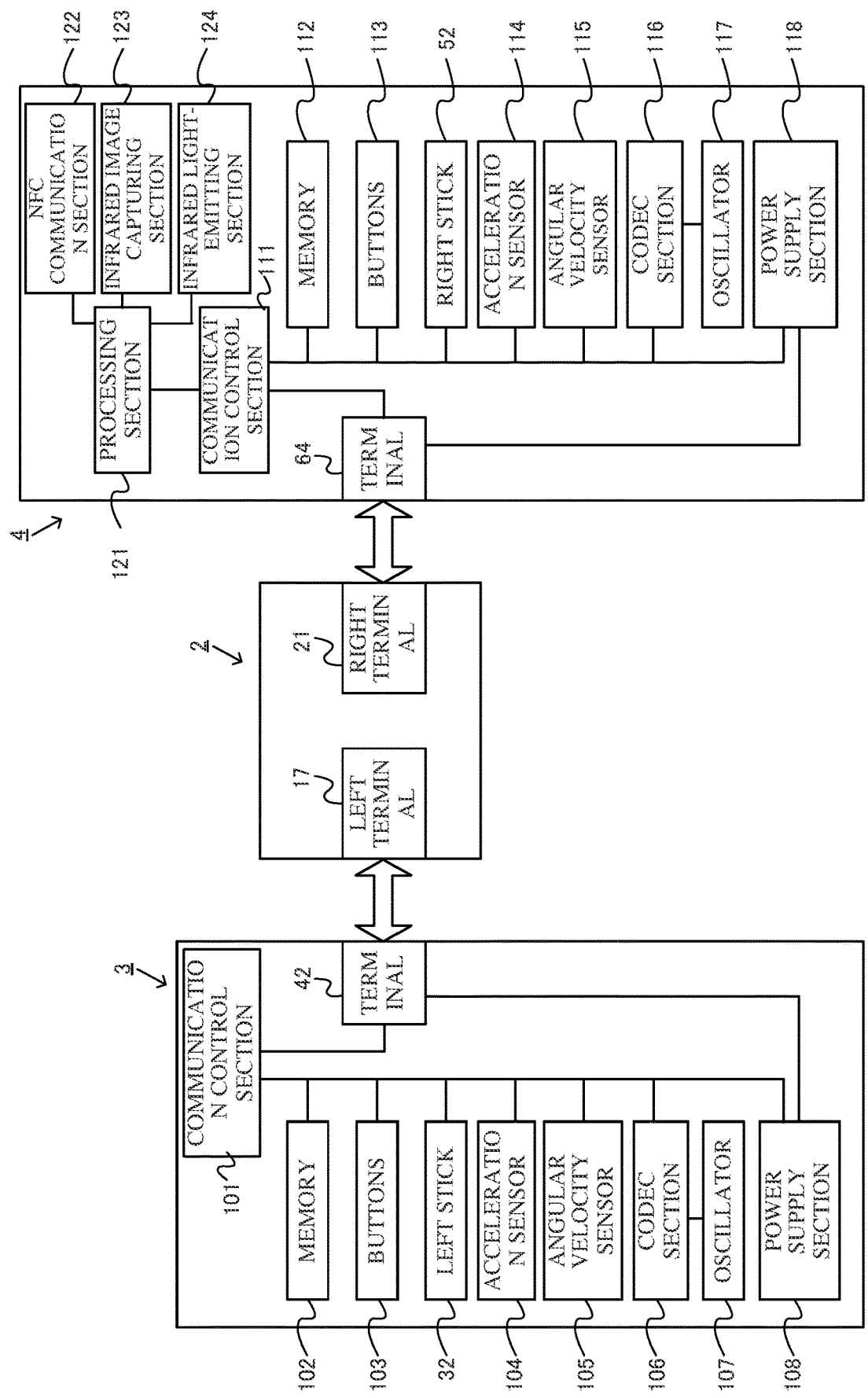
FIG. 3 is a block diagram showing a non-limiting example of the internal configurations of the main body apparatus 2, the left controller 3, and the right controller 4.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

Figure 7:
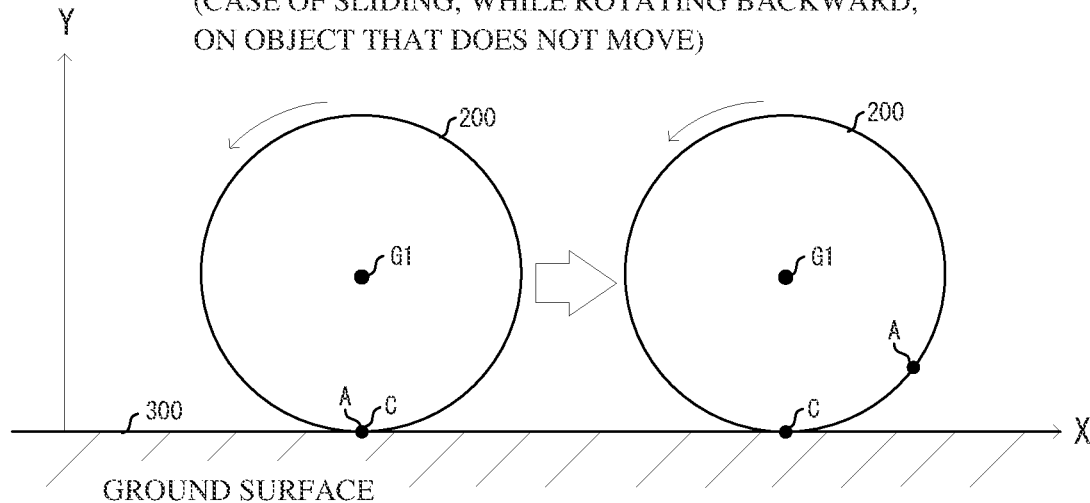
FIG. 7 is a non-limiting example diagram for describing determination in the case of sliding while rotating backward.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

The left controller 3 also includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, buttons 33 to 39, 43, 44, and 47). The left controller 3 also includes a left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104.

Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 3, the right controller 4 includes a communication control section 111, which communicates with the main body apparatus 2. The right controller 4 also includes a memory 112 which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, a right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Game Assumed in Exemplary Embodiment]

Next, an outline of game processing (an example of the information processing) executed in the game system 1 according to the exemplary embodiment will be described. A game assumed in the exemplary embodiment is, for example, a role-playing game in which a player object (sometimes referred to as "character") which performs actions in accordance with operations performed by a player moves and performs other actions in a virtual space (game space) in which various objects are placed, to achieve a predetermined objective. The game is not limited to the role-playing game, and may be other types of games (competitive game, etc.).

[Outline of Game Processing of Exemplary Embodiment]

In the game processing, actions, etc., of the character are controlled in accordance with operations performed by the player (user), and an image of the virtual space is taken by a virtual camera and displayed on the display 12, thereby advancing the game. In the game processing, physics calculation is performed. That is, in the game processing, the motion of each object in the virtual space is controlled by physics calculation based on virtual power, gravity, collision, etc. Appropriate processing can then be performed in accordance with the motion of each object controlled by the physics calculation.

Specifically, on the basis of the relationship between objects, it is determined whether one object is rolling or sliding on the other object. When the one object is rolling, a rolling sound is outputted from the speakers 88, and when the one object is sliding (moving while rubbing), a sliding sound is outputted from the speakers 88. Hereinafter, a specific description will be given with reference to the drawings. Instead of (or in addition to) outputting a rolling sound or a sliding sound from the speakers 88, other processes (such as displaying a virtual effect corresponding to rolling or sliding) may be performed.

[Case where Object Moves on Object that does not Move]

First, the case where an object moves on an object (surface) that does not move will be described with reference to FIG. 4 to FIG. 7. In this description, the case where a spherical object (sometimes referred to as "sphere object") 200 is moving on a ground object 300 is used as an example.

Figure 4:
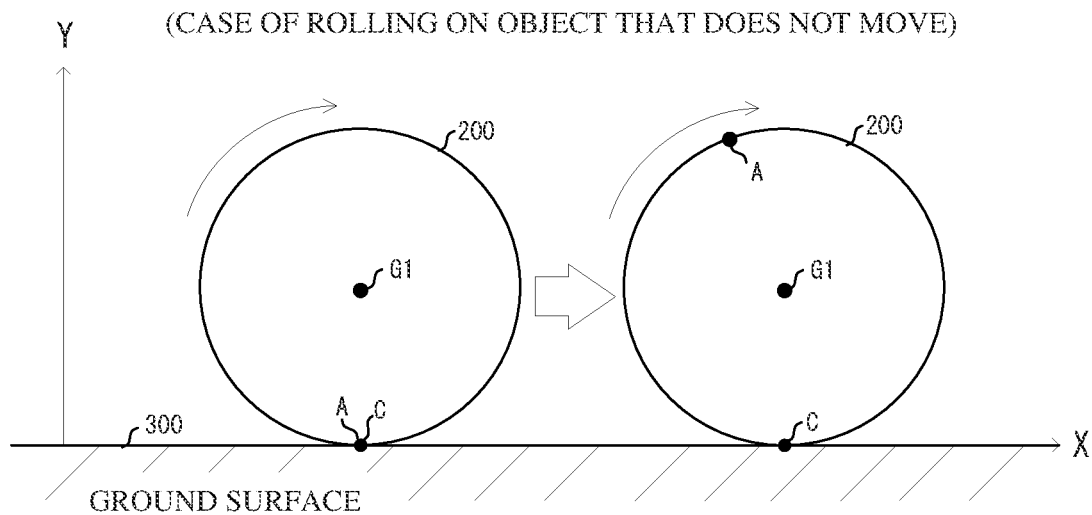
FIG. 4 is a non-limiting example diagram for describing rolling/sliding determination.

FIG. 4 is a diagram for describing the case where the sphere object 200 moves on the ground object 300 by rolling (without sliding). In FIG. 4, the sphere object 200 on the ground object 300 is moving in an X-axis direction by rolling (without sliding). In addition, in FIG. 4, G1 indicates the center of gravity of the sphere object 200, C indicates the point of contact between the sphere object 200 and the ground object 300, and A indicates a point on the surface of the sphere object 200. In FIG. 4, the position of the point A is moving as the sphere object 200 rolls.

As shown in FIG. 4, when the sphere object 200 moves in the X-axis direction by rolling without sliding, no sliding (rubbing) occurs at the point of contact C. From this, it can be said that a portion at the point of contact C of the sphere object 200 is not moving relative to a portion at the point of contact C of the ground object 300. In other words, the speed of the sphere object 200 at the point of contact C is 0 (zero). Therefore, when the speed of the sphere object 200 at the point of contact C is 0, it can be determined that the sphere object 200 is rolling on the ground object 300 without sliding.

Figure 5:
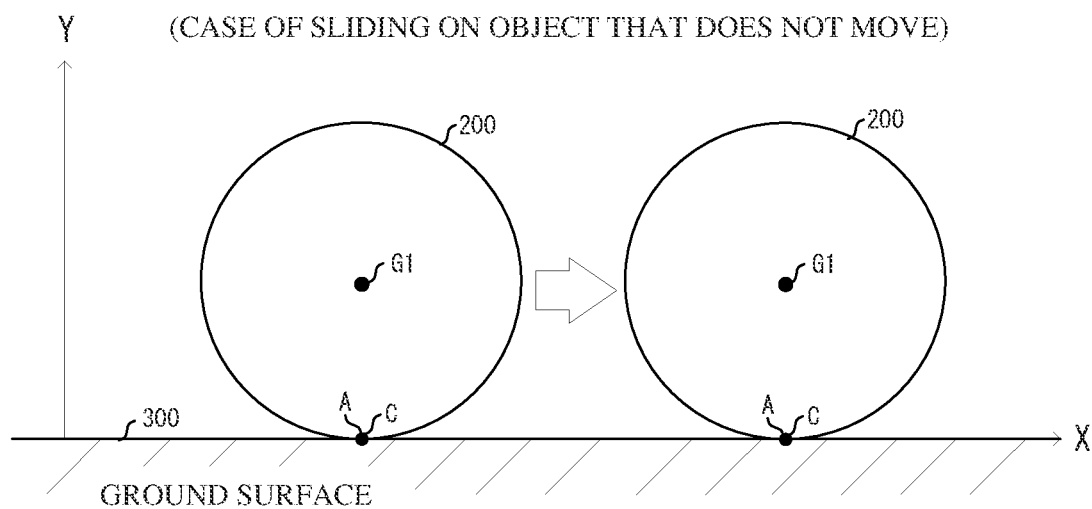
FIG. 5 is a non-limiting example diagram for describing the rolling/sliding determination.

FIG. 5 is a diagram for describing the case where the sphere object 200 moves on the ground object 300 while sliding (rubbing). In FIG. 5, the sphere object 200 on the ground object 300 is moving in the X-axis direction while sliding. In addition, in FIG. 5, G1 indicates the center of gravity of the sphere object 200, C indicates the point of contact between the sphere object 200 and the ground object 300, and A indicates a point on the surface of the sphere object 200. In FIG. 5, since the sphere object 200 is moving while sliding without rotating at all, the point A remains at the same position as the point of contact C.

As shown in FIG. 5, when the sphere object 200 moves in the X-axis direction while sliding without rotating at all, sliding (rubbing) occurs at the point of contact C. From this, it can be said that the portion at the point of contact C of the sphere object 200 is moving relative to the portion at the point of contact C of the ground object 300 which does not move. In other words, the speed of the sphere object 200 at the point of contact C is not 0 (zero). Therefore, when the speed of the sphere object 200 at the point of contact C is not 0, it can be determined that the sphere object 200 is sliding on the ground object 300.

Figure 6:
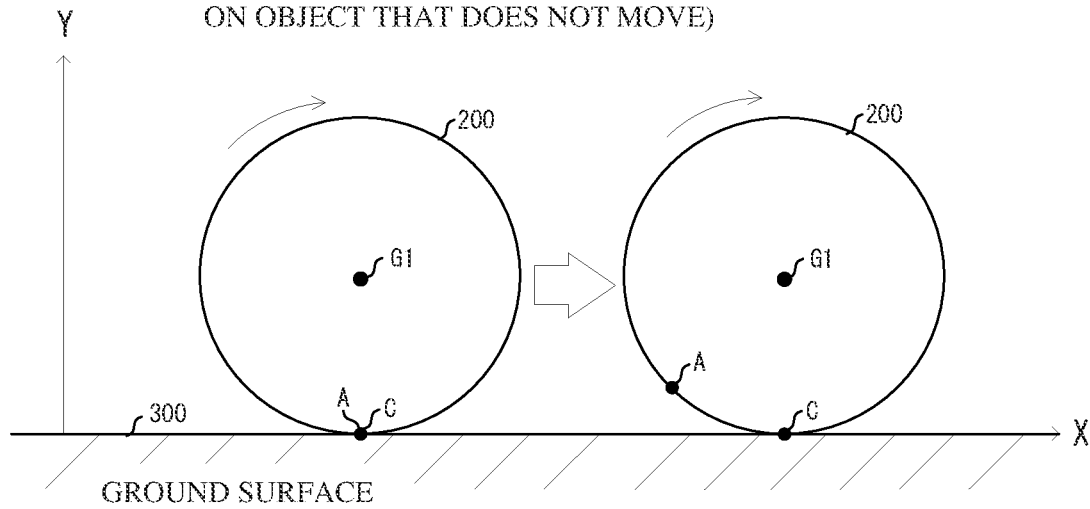
FIG. 6 is a non-limiting example diagram for describing determination in the case of sliding while rotating forward.

FIG. 6 is a diagram for describing the case where the sphere object 200 moves on the ground object 300 by sliding while rotating forward. In FIG. 6, the sphere object 200 on the ground object 300 is moving in the X-axis direction by sliding while rotating forward. In addition, in FIG. 6, G1 indicates the center of gravity of the sphere object 200, C indicates the point of contact between the sphere object 200 and the ground object 300, and A indicates a point on the surface of the sphere object 200. In FIG. 6, the position of the point A is moving as the sphere object 200 rotates forward.

As shown in FIG. 6, when the sphere object 200 moves in the X-axis direction by sliding while rotating forward, sliding (rubbing) occurs at the point of contact C. From this, as in the case of FIG. 5, the speed of the sphere object 200 at the point of contact C is not 0 (zero). In addition, as shown in FIG. 6, the speed in the X-axis direction of the point A with respect to the position of the center of gravity G1 of the sphere object 200 is a negative value. Therefore, when the speed of the sphere object 200 at the point of contact C is not 0 and the speed in the X-axis direction of the point A with respect to the position of the center of gravity G1 of the sphere object 200 is negative, it can be determined that the sphere object 200 is sliding on the ground object 300 while rotating forward.

FIG. 7 is a diagram for describing the case where the sphere object 200 moves on the ground object 300 by sliding while rotating backward. In FIG. 7, the sphere object 200 on the ground object 300 is moving in the X-axis direction by sliding while rotating backward. In addition, in FIG. 7, G1 indicates the center of gravity of the sphere object 200, C indicates the point of contact between the sphere object 200 and the ground object 300, and A indicates a point on the surface of the sphere object 200. In FIG. 7, the position of the point A is moving as the sphere object 200 rotates backward.

As shown in FIG. 7, when the sphere object 200 moves in the X-axis direction by sliding while rotating backward, sliding (rubbing) occurs at the point of contact C. From this, as in the case of FIG. 5, the speed of the sphere object 200 at the point of contact C is not 0 (zero). In addition, as shown in FIG. 7, the speed in the X-axis direction of the point A with respect to the position of the center of gravity G1 of the sphere object 200 (or the entire sphere object 200) is a positive value. Therefore, when the speed of the sphere object 200 at the point of contact C is not 0 and the speed in the X-axis direction of the point A with respect to the position of the center of gravity G1 of the sphere object 200 is positive, it can be determined that the sphere object 200 is sliding on the ground object 300 while rotating backward.

[Case where Object Moves on Moving Object]

Next, the case where an object moves on a moving object (surface) will be described with reference o FIG. 8 to FIG. 11. In this description, the case where the sphere object 200 is moving on a moving object (sometimes referred to as "movement object") 400 is used as an example. The moving object 400 is, for example, the deck of a moving ship. The case where the sphere object 200 is moving on the ground object 300 as described with reference to FIG. 4 to FIG. 7 can be considered as the case where the movement object 400 does not move (is stationary) in the following description.

Figure 8:
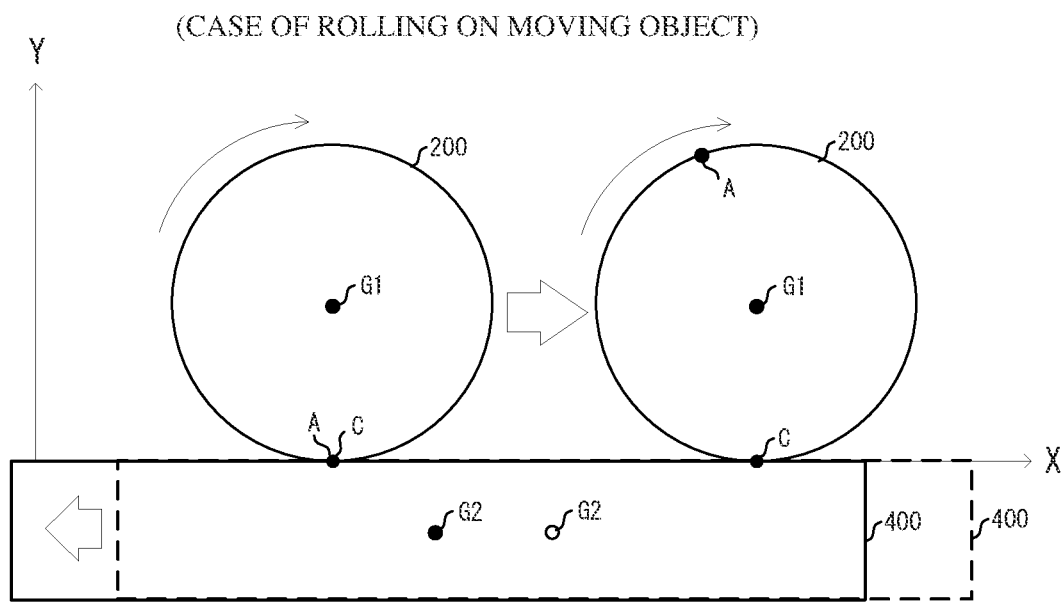
FIG. 8 is a non-limiting example diagram for describing the rolling/sliding determination.

FIG. 8 is a diagram for describing the case where the sphere object 200 moves on the movement object 400 by rolling (without sliding). In FIG. 8, the sphere object 200 is moving in the X-axis positive direction by rolling (without sliding) on the movement object 400 moving in the X-axis negative direction. In FIG. 8, the movement object 400 is moving from a position shown by a broken line to a position shown by a solid line. In addition, in FIG. 8, G1 indicates the center of gravity of the sphere object 200, G2 indicates the center of gravity of the movement object 400, C indicates the point of contact between the sphere object 200 and the movement object 400, and A indicates a point on the surface of the sphere object 200. In FIG. 8, the position point A is moving as the sphere object 200 rolls on the movement object 400.

As shown in FIG. 8, when the sphere object 200 moves in the X-axis direction by rolling on the movement object 400 without sliding, no sliding (rubbing) occurs at the point of contact C as in FIG. 4. From this, it can be said that a portion at the point of contact C of the sphere object 200 is not moving relative to a portion at the point of contact C of the movement object 400. In other words, the difference between the speed of the sphere object 200 and the speed of the movement object 400 at the point of contact C is 0 (zero). Therefore, when the difference between the speed of the sphere object 200 and the speed of the movement object 400 at the point of contact C is 0, it can be determined that the sphere object 200 is rolling on the movement object 400 without sliding.

Figure 9:
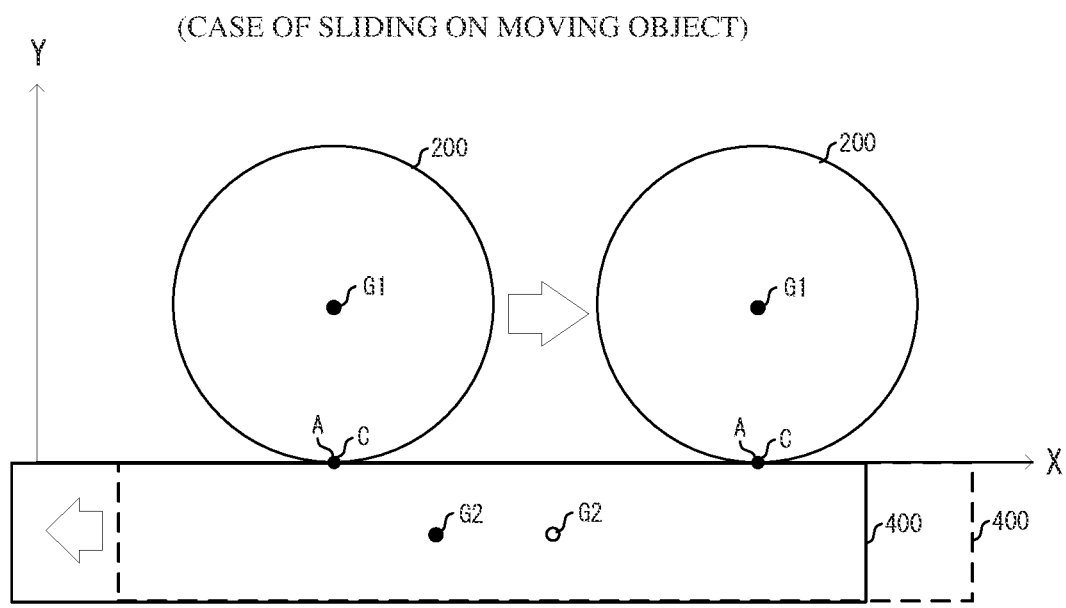
FIG. 9 is a non-limiting example diagram for describing the rolling/sliding determination.

FIG. 9 is a diagram for describing the case where the sphere object 200 moves on the movement object 400 while sliding (while rubbing). In FIG. 9, the sphere object 200 is moving in the X-axis positive direction while sliding on the movement object 400 moving in the X-axis negative direction. In addition, in FIG. 9, G1 indicates the center of gravity of the sphere object 200, G2 indicates the center of gravity of the movement object 400, C indicates the point of contact between the sphere object 200 and the movement object 400, and A indicates a point on the surface of the sphere object 200. In FIG. 9, since the sphere object 200 is moving while sliding without rotating at all, the point A remains at the same position as the point of contact C.

As shown in FIG. 9, when the sphere object 200 moves in the X-axis positive direction while sliding without rotating at all, sliding (rubbing) occurs at the point of contact C as in FIG. 5. From this, it can be said that the portion at the point of contact C of the sphere object 200 is moving relative to the portion at the point of contact C of the movement object 400. In other words, the difference between the speed of the sphere object 200 and the speed of the movement object 400 at the point of contact C is not 0 (zero). Therefore, when the difference between the speed of the sphere object 200 and the speed of the movement object 400 at the point of contact C is not 0, it can be determined that the sphere object 200 is sliding on the movement object 400.

Figure 10:
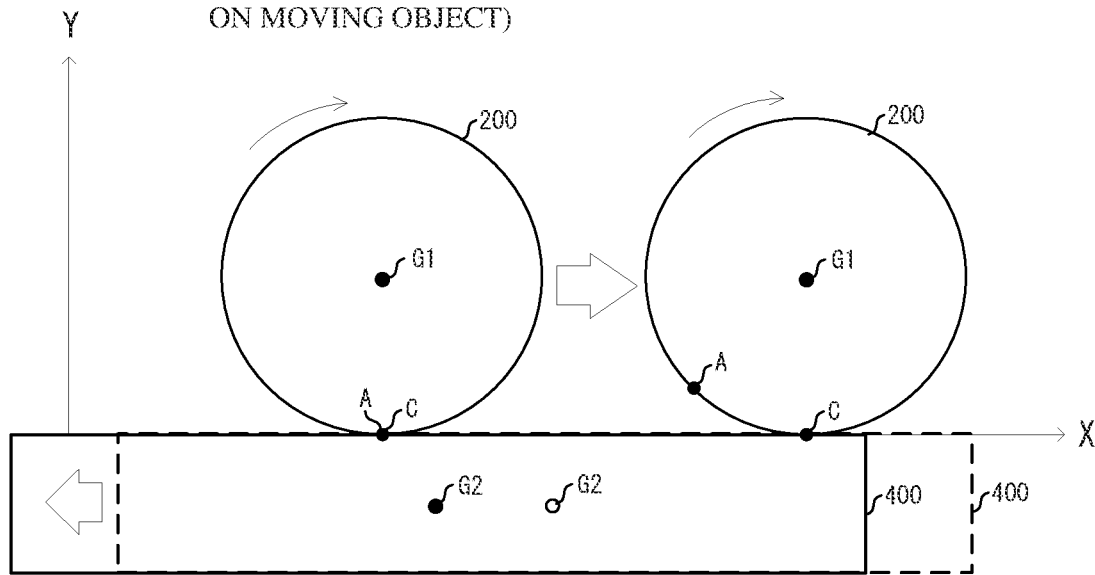
FIG. 10 is a non-limiting example diagram for describing determination in the case of sliding while rotating forward.

FIG. 10 is a diagram for describing the case where the sphere object 200 moves by sliding on the movement object 400 while rotating forward. In FIG. 10, the sphere object 200 is moving in the X-axis positive direction by sliding, while rotating forward, on the movement object 400 moving in the X-axis negative direction. In addition, in FIG. 10, G1 indicates the center of gravity of the sphere object 200, G2 indicates the center of gravity of the movement object 400, C indicates the point of contact between the sphere object 200 and the movement object 400, and A indicates a point on the surface of the sphere object 200. In FIG. 10, the position of the point A is moving as the sphere object 200 rotates forward.

As shown in FIG. 10, when the sphere object 200 moves in the X-axis positive direction by sliding while rotating forward, sliding (rubbing) occurs at the point of contact C as in FIG. 9. From this, as in the case of FIG. 9, the difference between the speed of the sphere object 200 and the speed of the movement object 400 at the point of contact C is not 0 (zero). In addition, as shown in FIG. 10, the speed in the X-axis direction of the point A with respect to the position of the center of gravity G1 of the sphere object 200 is a negative value. Therefore, when the difference between the speed of the sphere object 200 and the speed of the movement object 400 at the point of contact C is not 0 and the speed in the X-axis direction of the point A with respect to the position of the center of gravity G1 of the sphere object 200 is a negative value, it can be determined that the sphere object 200 is sliding on the movement object 400 while rotating forward.

Figure 11:
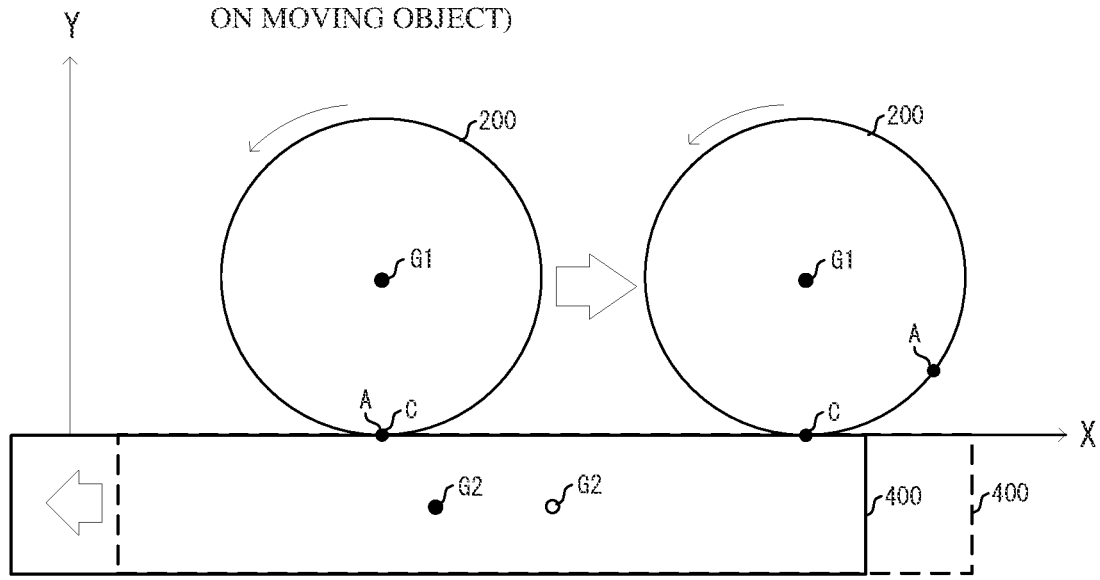
FIG. 11 is a non-limiting example diagram for describing determination in the case of sliding while rotating backward.

FIG. 11 is a diagram for describing the case where the sphere object 200 moves by sliding on the movement object 400 while rotating backward. In FIG. 11, the sphere object 200 is moving in the X-axis positive direction by sliding, while rotating backward, on the movement object 400 moving in the X-axis negative direction. In addition, in FIG. 11, G1 indicates the center of gravity of the sphere object 200, G2 indicates the center of gravity of the movement object 400, C indicates the point of contact between the sphere object 200 and the movement object 400, and A indicates a point on the surface of the sphere object 200. In FIG. 11, the position of the point A is moving as the sphere object 200 rotates backward.

As shown in FIG. 11, when the sphere object 200 moves in the X-axis positive direction by sliding while rotating backward, sliding (rubbing) occurs at the point of contact C as in FIG. 9. From this, as in the case of FIG. 9, the difference between the speed of the sphere object 200 and the speed of the movement object 400 at the point of contact C is not 0 (zero). In addition, as shown in FIG. 11, the speed in the X-axis direction of the point A with respect to the position of the center of gravity G1 of the sphere object 200 is a positive value. Therefore, when the difference between the speed of the sphere object 200 and the speed of the movement object 400 at the point of contact C is not 0 and the speed in the X-axis direction of the point A with respect to the position of the center of gravity G1 of the sphere object 200 is a positive value, it can be determined that the sphere object 200 is sliding on the movement object 400 while rotating backward.

The above description can be summarized as follows.
(1) When the difference between the speed (speed in the X-axis direction) of the sphere object 200 and the speed (speed in the X-axis direction) of the movement object 400 at the point of contact C (sometimes referred to as "first speed") is 0, it can be determined that the sphere object 200 is rolling on the movement object 400 without sliding (see FIG. 8).
(2) When the first speed is not 0, it can be determined that the sphere object 200 is sliding on the movement object 400 (see FIG. 9).
(3) When it is determined that the sphere object 200 is sliding on the movement object 400, if the speed in the X-axis direction of the point A with respect to the position of the center of gravity G1 of the sphere object 200 (sometimes referred to as "third speed") is a negative value, it can be determined that the sphere object 200 is sliding on the movement object 400 while rotating forward (see FIG. 10).
(4) When it is determined that the sphere object 200 is sliding on the movement object 400, if the third speed is a positive value, it can be determined that the sphere object 200 is sliding on the movement object 400 while rotating backward (see FIG. 11).

[Method of Considering Relative Speed Between Centers of Gravity of Objects]

Next, a method of considering the relative speed between the centers of gravity of objects in the above-described determination of the state of the object (determination as to whether the object is rolling or sliding) will be described.

Specifically (see FIG. 10), when the absolute value (sometimes referred to as "ratio value") of a value obtained by dividing the first speed by the speed difference in the X-axis direction between the center of gravity G1 of the sphere object 200 and the center of gravity G2 of the movement object 400 (relative speed in the X-axis direction between the center of gravity G1 and the center of gravity G2: sometimes referred to as "second speed") is equal to or lower than a predetermined value D (e.g., D=0.5), it is determined that the sphere object 200 is rolling on the movement object 400 without sliding. That is, when the following (Formula 1) is satisfied, it is determined that the sphere object 200 is rolling on the movement object 400 without sliding.

$$|\text{first speed/second speed}| \leq D \quad \text{(Formula 1)}$$

On the other hand (see FIG. 11), when the above-described absolute value is higher than the predetermined value D (e.g., D=0.5), it is determined that the sphere object 200 is sliding on the movement object 400. That is, when the following (Formula 2) is satisfied, it is determined that the sphere object 200 is sliding on the movement object 400.

$$|\text{first speed/second speed}| > D \quad \text{(Formula 2)}$$

By considering the relative speed between the centers of gravity of the objects as described above, it becomes easier to determine that the object is rolling, as the second speed increases. This can avoid giving an uncomfortable feeling by determining that the object is rolling, and performing later-described control of outputting a rolling sound in a situation in which the relative speed between both objects is high and it is difficult for the player to recognize (see) whether or not the object is rolling.

Here, the already described method of determining that the sphere object 200 is sliding on the movement object 400 while rotating forward can also be applied to the method of considering the relative speeds between the centers of gravity of the objects as described above (see FIG. 10). Similarly, the method of determining that the sphere object 200 is sliding on the movement object 400 while rotating backward can also be applied to the method of considering the relative speeds between the centers of gravity of the objects as described above (see FIG. 11).

Either one of the above-described method of considering the relative speeds between the centers of gravity of the objects and the above-described method of not considering the relative speeds between the centers of gravity of the objects may be used, or both of these methods may be used.

Figure 12:
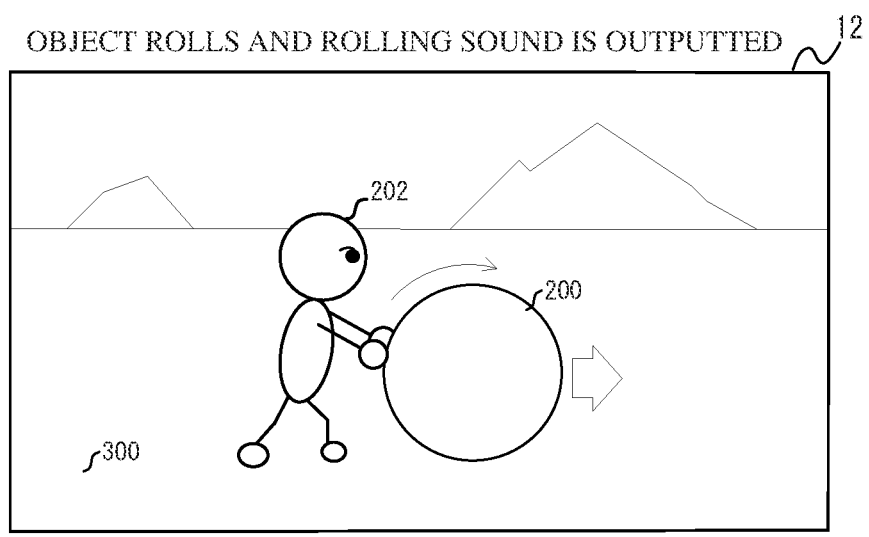
FIG. 12 is a diagram for describing a non-limiting example of the case where it is determined as rolling and a rolling sound is outputted.
Figure 13:
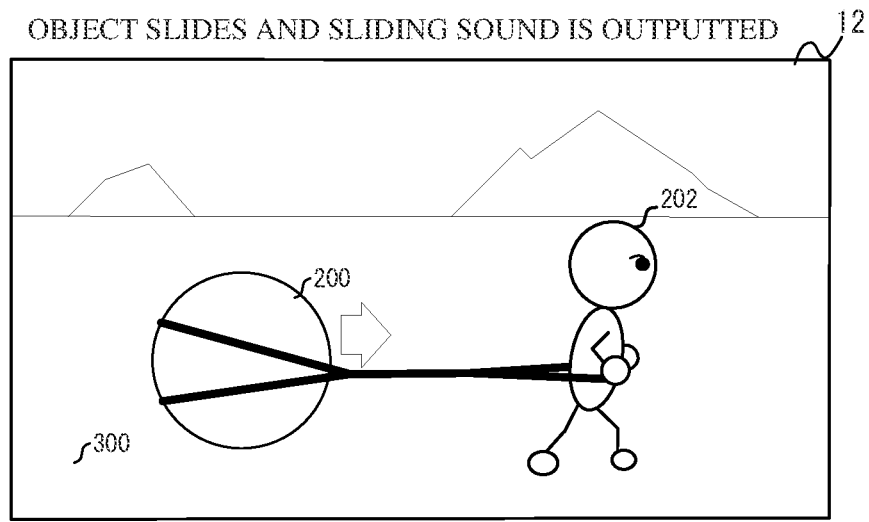
FIG. 13 is a diagram for describing a non-limiting example of the case where it is determined as sliding and a sliding sound is outputted.

Next, an example of control using the results of the above-described rolling and sliding determination will be described. FIG. 12 is a diagram for describing an example of processing in the case where it is determined that an object is rolling. FIG. 13 is a diagram for describing an example of processing in the case where it is determined that an object is sliding. When a player character 202 is rolling the sphere object 200 on the ground object 300 as shown in FIG. 12, if it is determined by the above-described method that the sphere object 200 is rolling (without sliding), a rolling sound is outputted from the speakers 88. Meanwhile, when the player character 202 is pulling and sliding the sphere object 200 on the ground object 300 as shown in FIG. 13, if it is determined by the above-described method that the sphere object 200 is sliding, a sliding sound is outputted from the speakers 88. In addition, when it is determined that the sphere object 200 is sliding, if it is determined that the sphere object 200 is rotating forward, a sliding sound for forward rotation is outputted from the speakers 88, and if it is determined that the sphere object 200 is rotating backward, a sliding sound for backward rotation is outputted from the speakers 88. Instead of (or in addition to) the above-described rolling sound, for example, a predetermined virtual effect may be displayed for the sphere object 200. In addition, instead of (or in addition to) the above-described sliding sound, for example, a virtual effect different from the above-described predetermined virtual effect may be displayed for the sphere object 200.

[Details of Information Processing of Exemplary Embodiment]

Next, the information processing of the exemplary embodiment will be described in detail with reference to FIG. 14 to FIG. 17.

[Data to be Used]

Figure 14:
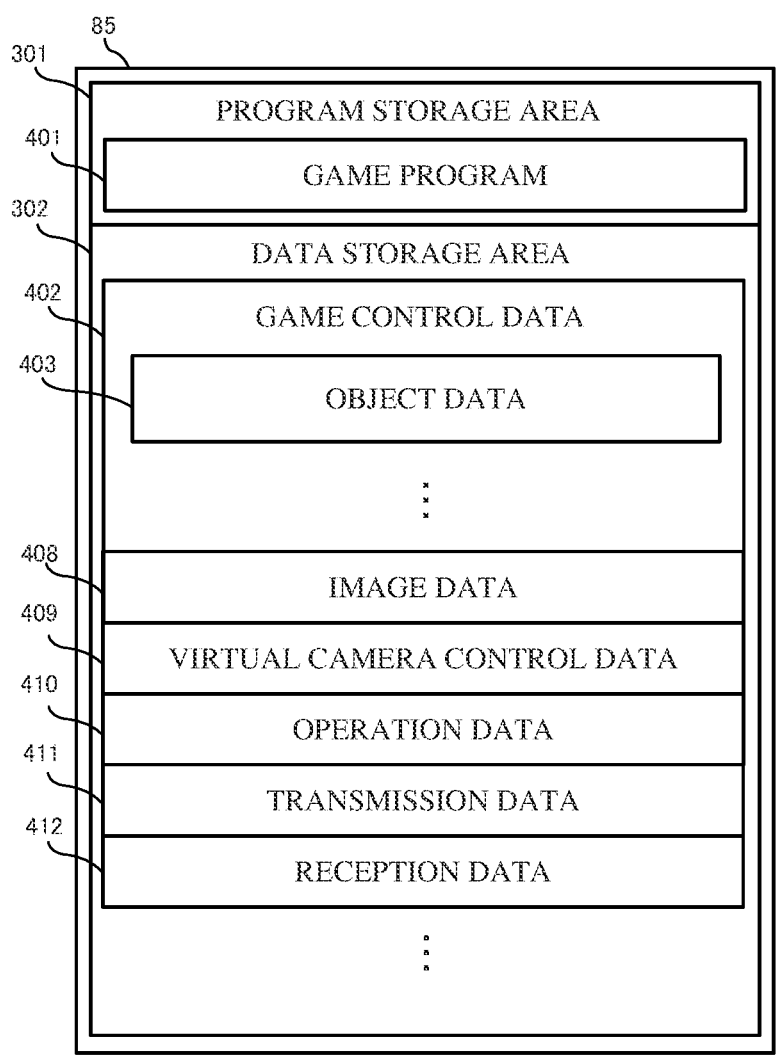
FIG. 14 shows a non-limiting example of various types of data stored in a DRAM 85.

Various types of data used in the game processing will be described. FIG. 14 shows an example of data stored in the DRAM 85 of the game system 1. As shown in FIG. 14, the DRAM 85 is provided with at least a program storage area 301 and a data storage area 302. A game program 401 is stored in the program storage area 301. In the data storage area 302, game control data 402, image data 408, virtual camera control data 409, operation data 410, transmission data 411, reception data 412, etc., are stored. The game control data 402 includes object data 403.

The game program 401 is a game program for executing the game processing. The game program 401 includes a physics calculation program for performing physics calculation that reproduces the motion of each object in the virtual space (game space) as in the real world.

The object data 403 is data of objects to be placed in the virtual space, such as the player character, other characters, items, ground, rocks, stones, trees, and buildings. The object data 403 is also data indicating the shape, position, orientation, movement state, action state, attribute, etc., of each object. In addition, the above-described physics calculation program performs physics calculation using the object data 403.

The image data 408 is image data of backgrounds, virtual effects, etc.

The virtual camera control data 409 is data for controlling the motion of the virtual camera placed in the virtual space. Specifically, the virtual camera control data 409 is data that specifies the position/orientation, angle of view, imaging direction, etc., of the virtual camera.

The operation data 410 is data indicating the contents of operations performed on the left controller 3 and the right controller 4. The operation data 410 includes, for example, data indicating motions and orientation changes of the left controller 3 and the right controller 4 and input states regarding press states and the like of various buttons. The contents of the operation data 410 are updated at a predetermined cycle on the basis of signals from the left controller 3 and the right controller 4.

The transmission data 411 is data to be transmitted to other game systems 1, and is data including at least information for identifying the transmission source, and the contents of the operation data 410.

The reception data 412 is data stored such that transmission data received from other game systems 1 (i.e., transmission sources) can be discerned for each of the other game systems 1.

In addition, various types of data to be used in game processing is stored as necessary in the DRAM 85.

[Details of Game Processing]

Figure 15:
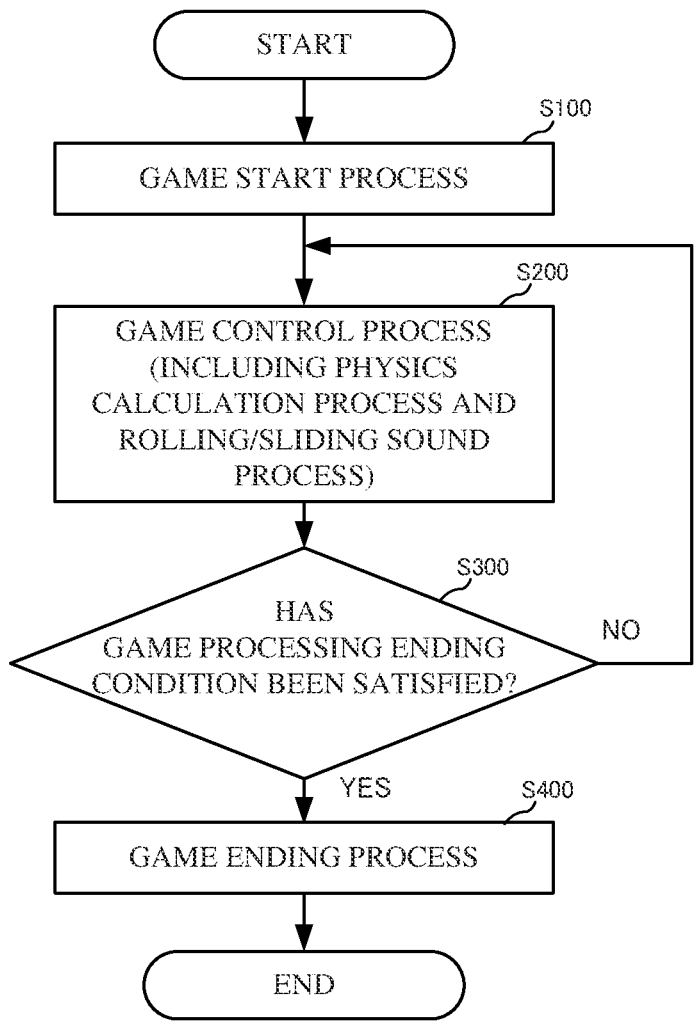
FIG. 15 is a non-limiting example of a flowchart of game processing.
Figure 16:
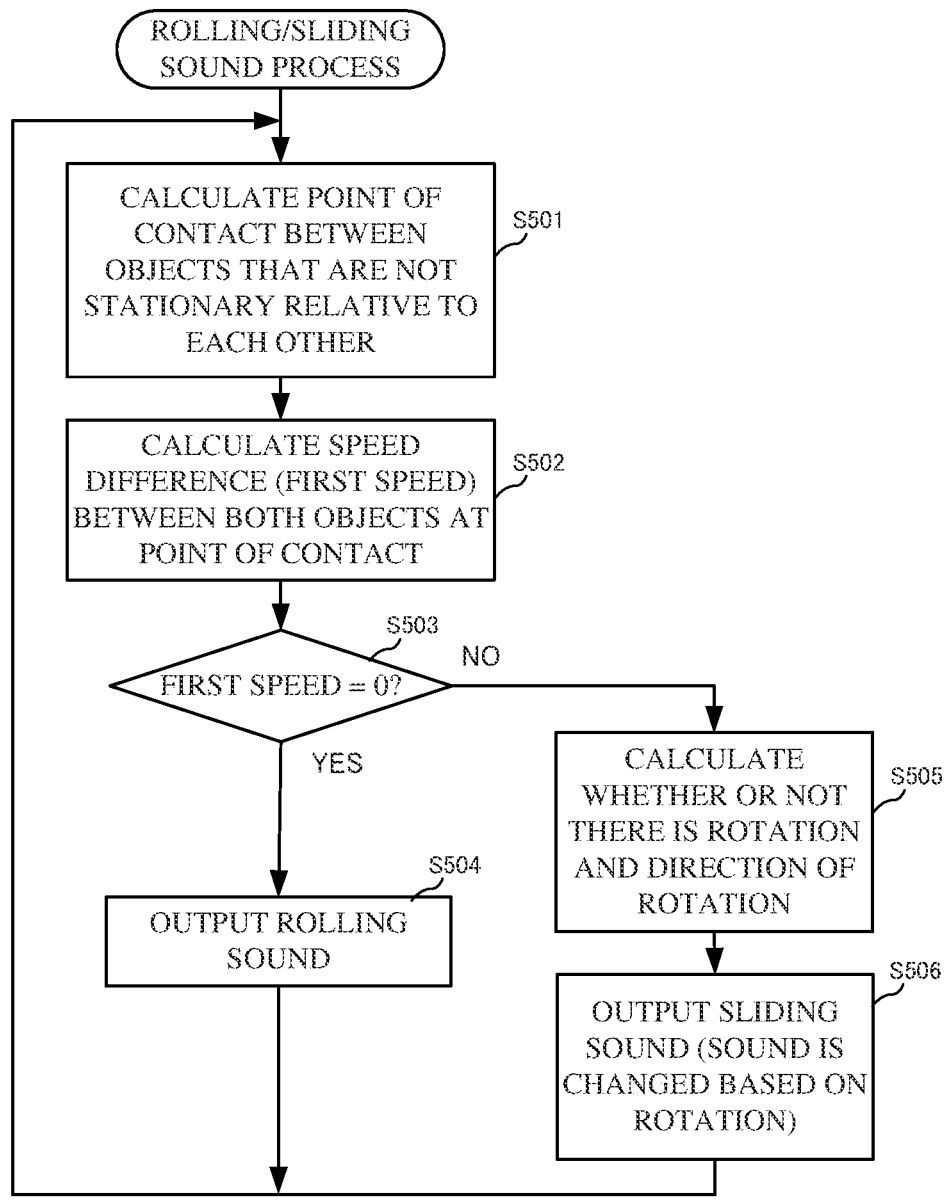
FIG. 16 is a non-limiting example of a flowchart of the game processing.
Figure 17:
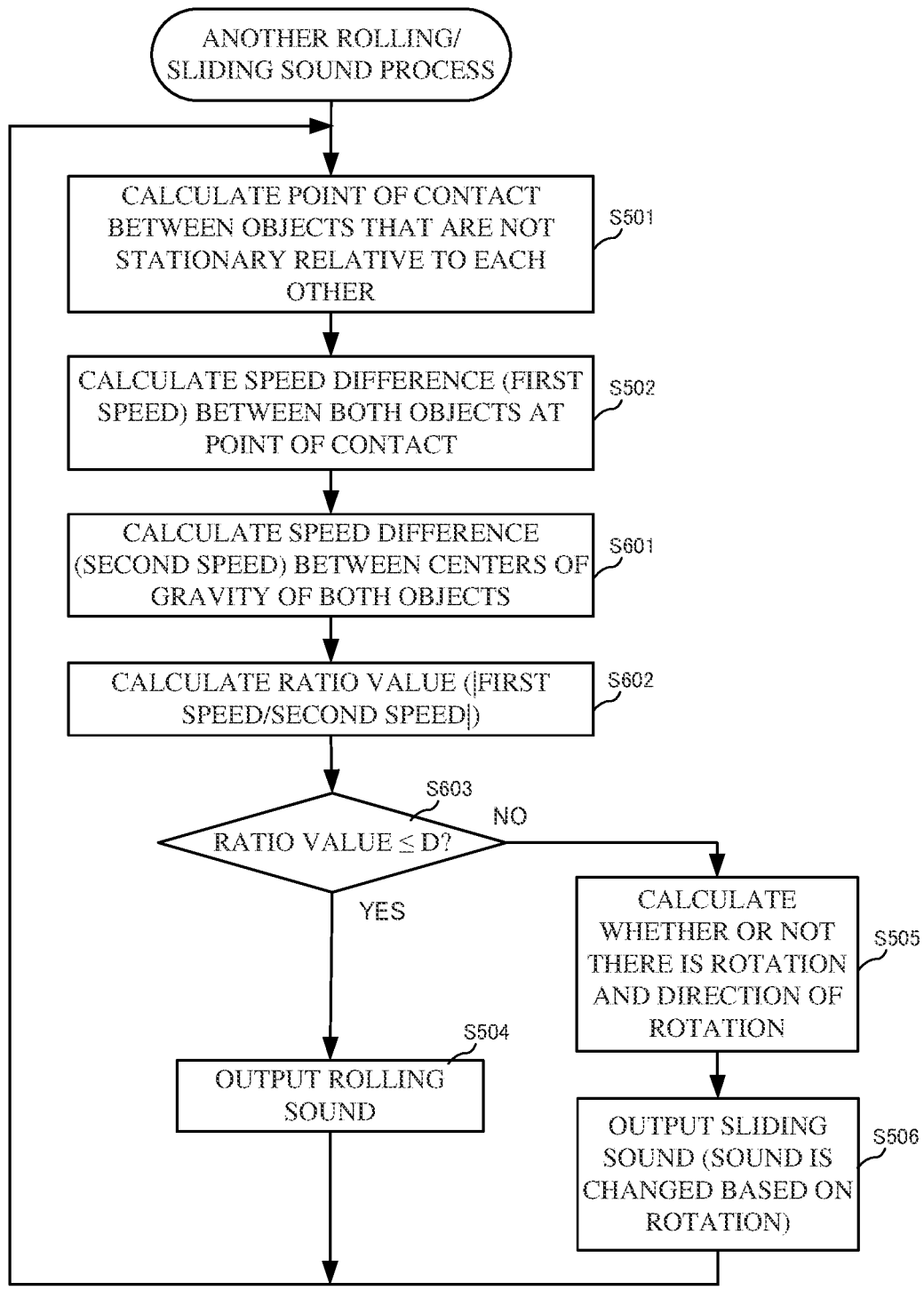
FIG. 17 is a non-limiting example of a flowchart of the game processing.

Next, the game processing according to the exemplary embodiment will be described in detail with reference to flowcharts. FIG. 15 to FIG. 17 are each an example of a flowchart showing the details of the game processing according to the exemplary embodiment.

First, upon start of the game processing, the processor 81 performs a game start process in step S100 in FIG. 15. For example, the processor 81 displays, on a display section (e.g., the display 12), a representation showing the start of the game processing. Then, the processing proceeds to step S200.

In step S200, the processor 81 performs a game control process. Specifically, the processor 81 performs a process of advancing the game by, for example, causing the player character to perform an action in the virtual space on the basis of an operation performed by the player. In addition, the processor 81 reproduces the motion of each object in the virtual space as in the real world by performing physics calculation on the basis of the object data 403, etc. During the execution of the game control process, acquisition of operation data, control of each object in the virtual space, image display, etc., are performed every frame (i.e., at predetermined time intervals).

In addition, in the game control process in step S200, the processor 81 executes a rolling/sliding sound process for objects on the basis of the results of the physics calculation. FIG. 16 is an example of a flowchart of the rolling/sliding sound process.

In step S501 in FIG. 16, the processor 81 calculates the point of contact C (see FIG. 8, etc.) between objects that are not stationary relative to each other, on the basis of the object data 403, etc. Then, the processing proceeds to step S502. The calculation of the point of contact C between the objects may also be performed during a period when both objects that are in contact with each other are stationary.

In step S502, the processor 81 calculates the speed difference (first speed) between both objects (objects that are in contact with each other) at the point of contact C calculated in step S501, on the basis of the object data 403, etc. Specifically, the processor 81 calculates the difference (first speed) between the speed (speed in the X-axis direction) of the sphere object 200 and the speed (speed in the X-axis direction) of the movement object 400 at the point of contact C as described with reference to FIG. 8, etc. Then, the processing proceeds to step S503.

In step S503, the processor 81 determines whether or not the first speed calculated in step S502 is 0. When this determination is YES, the processing proceeds to step S504, and when this determination is NO, the processing proceeds to step S505.

In step S504, the processor 81 determines that the object is rolling, and outputs a rolling sound from the speakers 88 as described with reference to FIG. 12. Then, the processing returns to step S501.

In step S505, the processor 81 calculates whether or not the object is rotating and the direction of rotation on the basis of the object data 403, etc. Specifically, as described with reference to FIG. 10 and FIG. 11, when the speed (third speed) in the X-axis direction of the point A with respect to the position of the center of gravity G1 of the sphere object 200 is 0, the processor 81 determines that the object is sliding without rotating: when the third speed is negative, the processor 81 determines that the object is sliding while rotating forward; and when the third speed is positive, the processor 81 determines that the object is sliding while rotating backward. Then, the processing proceeds to step S506.

In step S506, as described with reference to FIG. 13, the processor 81 determines that the object is sliding, and outputs a sliding sound from the speakers 88. In addition, the processor 81 changes the sliding sound to be outputted from the speakers 88, on the basis of the determination in step S505. For example, a relatively high pitched sliding sound is outputted when the object is rotating forward, and a relatively low pitched sliding sound is outputted when the object is rotating backward. Then, the processing returns to step S501.

In the game control process in step S200, the processor 81 can also execute another rolling/sliding sound process on the basis of the results of the physics calculation. FIG. 17 is an example of a flowchart of the other rolling/sliding sound process.

In the flowchart in FIG. 17, step S503 in the flowchart in FIG. 16 is replaced with steps S601 to S603. Therefore, steps S601 to S603 will be described below, and the description of the other steps is omitted.

In step S601, the processor 81 calculates the speed difference (second speed) between the centers of gravity of both objects coming into contact with each other at the point of contact C calculated in step S501 (objects that are in contact with each other), on the basis of the object data 403, etc. Specifically, as already described, the processor 81 calculates the speed difference (second speed) in the X-axis direction between the center of gravity G1 of the sphere object 200 and the center of gravity G2 of the movement object 400 (see FIG. 8, etc.). Then, the processing proceeds to step S602.

In step S602, the processor 81 calculates a ratio value. Specifically, as already described, the processor 81 calculates the absolute value (ratio value) of the value obtained by dividing the first speed by the second speed. Then, the processing proceeds to step S603.

In step S603, the processor 81 determines whether or not the ratio value calculated in step S602 is equal to or lower than a predetermined value D (e.g., D=0.5). When this determination is YES, the processing proceeds to step S504, and when this determination is NO, the processing proceeds to step S505.

This is the end of the description of the rolling/sliding sound process. Either one of the rolling/sliding sound process described with reference to FIG. 16 and the rolling/sliding sound process described with reference to FIG. 17 may be executed, or both of these processes may be executed.

Referring back to FIG. 15, in step S300, the processor 81 determines whether or not a game processing ending condition has been satisfied. When this determination is YES, the processing proceeds to step S400, and when this determination is NO, the processing returns to step S200 and the game is continued.

In step S400, the processor 81 performs a game ending process of ending the game processing. Then, the game processing is ended.

As described above, according to the exemplary embodiment, whether an object is rolling or sliding on another object is determined, and a rolling sound or a sliding sound can be outputted depending on this determination (see FIG. 16, FIG. 17, etc.). In addition, according to the exemplary embodiment, by considering the relative speed between the centers of gravity of the objects, it becomes easier to determine that the object is rolling, as the second speed increases (see FIG. 17, etc.). This can avoid giving an uncomfortable feeling by determining that the object is rolling, and performing control of outputting a rolling sound in a situation in which the relative speed between both objects is high and it is difficult for the player to recognize (see) whether or not the object is rolling.

[Modifications]

In the above-described exemplary embodiment, the example in which the second speed, etc., are calculated using the centers of gravity (G1, G2) of the objects has been described. However, a predetermined reference point (point at which the speed of the object can be represented) may be used instead of the centers of gravity. For example, instead of the centers of gravity, the center point (graphical center point) of the object or a point calculated as the rotation center of the object in physics calculation may be used.

In the above-described exemplary embodiment, as an example, the same value D (e.g., D=0.5) is used for the above-described (Formula 1): |first speed/second speed|≤D and (Formula 2): |first speed/second speed|>D when determining the state of the object (whether the object is rolling or sliding) in consideration of the relative speed between the centers of gravity of the objects (see FIG. 8 to FIG. 11 and FIG. 17). However, different values of D may be used for (Formula 1) and (Formula 2). For example, as shown below, (Formula 2') in which D' different from D (D'>D or D'<D)

is used instead of D (e.g., D=0.5) for (Formula 2) may be used.

$$|\text{first speed/second speed}| > D' \quad \text{(Formula 2')}$$

When D'>D in the above (Formula 2'), a case (period) in which neither (Formula 1) nor (Formula 2) applies occurs. Then, in such a case (period), both the rolling sound and the sliding sound may not necessarily be outputted, and in addition, another sound different from the rolling sound and the sliding sound may be outputted. On the other hand, when D'<D in the above (Formula 2'), a case (period) in which both (Formula 1) and (Formula 2) apply occurs. Then, in such a case (period), both the rolling sound and the sliding sound may be outputted.

In the above-described exemplary embodiment, when both the absolute value of the first speed and the absolute value of the second speed are equal to or lower than the predetermined threshold in the above-described (Formula 1) and (Formula 2), the sphere object 200 may be considered (determined) not to be moving relative to the movement object 400, and neither the rolling sound nor the sliding sound may be outputted.

In the exemplary embodiment, a case in which a series of processes regarding the game processing are executed in a single game apparatus (main body apparatus 2) has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the game apparatus (main body apparatus 2) sends operation data indicating operations performed by the user to a predetermined server, various game processes are executed in the server; and the execution result is streaming-distributed as a moving image/sound to the game apparatus (main body apparatus 2).

While the exemplary embodiment and the modifications have been described, the description thereof is in all aspects illustrative and not restrictive. It is to be understood that various other modifications and variations may be made to the exemplary embodiment and the modifications.

What is claimed is:

1. A non-transitory computer-readable storage medium having stored therein instructions that, when executed by a processor of an information processing apparatus, cause the information processing apparatus to:
   control motion of a first object in a virtual space;
   when the first object and another object are in contact with each other and are not stationary relative to each other,
   calculate a point of contact between the first object and the other object;
   compare a first speed indicating a speed difference between the first object and the other object at the point of contact and a second speed indicating a speed difference between a center of gravity or a predetermined reference point of the first object and a center of gravity or a predetermined reference point of the other object; and
   when the first speed or a ratio of the first speed to the second speed satisfies a first condition of being within a first range including 0,
   perform a first process for the first object, and
   when the first speed or the ratio of the first speed to the second speed satisfies a second condition of being within a second range not including 0,
   perform a second process for the first object.

2. The storage medium according to claim 1, wherein
   the first process is a process of outputting a first sound associated with the first object, and
   the second process is a process of outputting a second sound associated with the first object and different from the first sound.

3. The storage medium according to claim 2, wherein
   the first process is a process performed when the first object is rolling on the other object, and
   the second process is a process performed when the first object is rubbing or sliding on the other object.

4. The storage medium according to claim 3, wherein the instructions further cause the information processing apparatus to:
   when the second condition is satisfied,
   determine a direction in which the first object rotates while rubbing or sliding on the other object, on the basis of whether a speed of the first object at the point of contact with respect to the center of gravity or the predetermined reference point of the first object is positive or negative.

5. The storage medium according to claim 2, wherein the instructions further cause the information processing apparatus to control the motion of the first object on the basis of physics calculation based on at least virtual power, virtual gravity, and collision.

6. The storage medium according to claim 1, wherein the second range is a range where the first speed or the ratio of the first speed to the second speed falls outside the first range.

7. The storage medium according to claim 1, wherein
   the other object is an object that does not move in the virtual space,
   the first speed is a speed of the first object at the point of contact, and
   the second speed is a speed of the center of gravity or the predetermined reference point of the first object.

8. The storage medium according to claim 7, wherein the other object is a terrain object in the virtual space.

9. The storage medium according to claim 1, wherein
   the other object is an object that moves in the virtual space,
   the first speed is a relative speed between the first object and the other object at the point of contact, and
   the second speed is a relative speed between the center of gravity or the predetermined reference point of the first object and the center of gravity or the predetermined reference point of the other object.

10. A game processing system, comprising:
a processor and a memory coupled thereto, the processor being configured to control the processing system to at least:
control motion of a first object in a virtual space;
when the first object and another object are in contact with each other and are not stationary relative to each other, calculate a point of contact between the first object and the other object;
compare a first speed indicating a speed difference between the first object and the other object at the point of contact and a second speed indicating a speed difference between a center of gravity or a predetermined reference point of the first object and a center of gravity or a predetermined reference point of the other object; and
when the first speed or a ratio of the first speed to the second speed satisfies a first condition of being within a first range including 0,
perform a first process for the first object, and
when the first speed or the ratio of the first speed to the second speed satisfies a second condition of being within a second range not including 0,
perform a second process for the first object.

11. The game processing system according to claim 10, wherein
the first process is a process of outputting a first sound associated with the first object, and
the second process is a process of outputting a second sound associated with the first object and different from the first sound.

12. The game processing system according to claim 11, wherein
the first process is a process performed when the first object is rolling on the other object, and
the second process is a process performed when the first object is rubbing or sliding on the other object.

13. The game processing system according to claim 12, wherein the processor is further configured to:
when the second condition is satisfied,
determine a direction in which the first object rotates while rubbing or sliding on the other object, on the basis of whether a speed of the first object at the point of contact with respect to the center of gravity or the predetermined reference point of the first object is positive or negative.

14. The game processing system according to claim 11, wherein the processor is further configured to control the motion of the first object on the basis of physics calculation based on at least virtual power, virtual gravity, and collision.

15. The game processing system according to claim 10, wherein the second range is a range where the first speed or the ratio of the first speed to the second speed falls outside the first range.

16. The game processing system according to claim 10, wherein
the other object is an object that does not move in the virtual space,
the first speed is a speed of the first object at the point of contact, and
the second speed is a speed of the center of gravity or the predetermined reference point of the first object.

17. The game processing system according to claim 16, wherein the other object is a terrain object in the virtual space.

18. The game processing system according to claim 10, wherein
the other object is an object that moves in the virtual space,
the first speed is a relative speed between the first object and the other object at the point of contact, and
the second speed is a relative speed between the center of gravity or the predetermined reference point of the first object and the center of gravity or the predetermined reference point of the other object.

19. A game processing apparatus, comprising:
a processor and a memory coupled thereto, the processor being configured to control the game processing apparatus to at least:
control motion of a first object in a virtual space;
when the first object and another object are in contact with each other and are not stationary relative to each other, calculate a point of contact between the first object and the other object;
compare a first speed indicating a speed difference between the first object and the other object at the point of contact and a second speed indicating a speed difference between a center of gravity or a predetermined reference point of the first object and a center of gravity or a predetermined reference point of the other object; and
when the first speed or a ratio of the first speed to the second speed satisfies a first condition of being within a first range including 0,
perform a first process for the first object, and
when the first speed or the ratio of the first speed to the second speed satisfies a second condition of being within a second range not including 0,
perform a second process for the first object.

20. The game processing apparatus according to claim 19, wherein
the first process is a process of outputting a first sound associated with the first object, and
the second process is a process of outputting a second sound associated with the first object and different from the first sound.

21. A game processing method executed by a computer configured to control a game processing system, the game processing method causing the game processing system to:
control motion of a first object in a virtual space;
when the first object and another object are in contact with each other and are not stationary relative to each other, calculate a point of contact between the first object and the other object;
compare a first speed indicating a speed difference between the first object and the other object at the point of contact and a second speed indicating a speed difference between a center of gravity or a predetermined reference point of the first object and a center of gravity or a predetermined reference point of the other object; and
when the first speed or a ratio of the first speed to the second speed satisfies a first condition of being within a first range including 0,
perform a first process for the first object, and
when the first speed or the ratio of the first speed to the second speed satisfies a second condition of being within a second range not including 0,
perform a second process for the first object.

22. The game processing method according to claim 21, wherein
the first process is a process of outputting a first sound associated with the first object, and the second process is a process of outputting a second sound associated with the first object and different from the first sound.

\* \* \* \* \*